United States Patent
Bellamy et al.

[11] Patent Number: 6,161,588
[45] Date of Patent: Dec. 19, 2000

[54] LINING OF PIPELINES AND PASSAGEWAYS

[76] Inventors: Norman West Bellamy; Sheila Bellamy, both of 95 St. Martins Road Finham, Coventry CV3 6ES, United Kingdom

[21] Appl. No.: 09/068,193
[22] PCT Filed: Oct. 21, 1996
[86] PCT No.: PCT/GB96/02586
  § 371 Date: Jul. 15, 1998
  § 102(e) Date: Jul. 15, 1998
[87] PCT Pub. No.: WO97/16301
  PCT Pub. Date: May 9, 1997

[30] Foreign Application Priority Data

Nov. 1, 1995 [GB] United Kingdom ............... 9522343

[51] Int. Cl.$^7$ .............................................. F16L 55/1645
[52] U.S. Cl. ................................. 138/98; 138/97; 138/148
[58] Field of Search ................................. 138/97, 98, 148

[56] References Cited

U.S. PATENT DOCUMENTS

| | | | |
|---|---|---|---|
| Re. 16,523 | 1/1927 | Bille ......................................... | 138/148 |
| 4,135,958 | 1/1979 | Wood ....................................... | 138/97 |
| 4,170,248 | 10/1979 | Bennett et al. ......................... | 138/97 |
| 4,752,431 | 6/1988 | Knowles .................................. | 138/98 |
| 5,411,060 | 5/1995 | Chandler ................................. | 138/98 |
| 5,427,154 | 6/1995 | Stephens ................................. | 138/97 |
| 5,656,117 | 8/1997 | Wood et al. ............................. | 138/97 |
| 5,791,378 | 8/1998 | Stephens ................................. | 138/97 |
| 5,803,665 | 9/1998 | Stephens ................................. | 138/98 |

*Primary Examiner*—James Hook
*Attorney, Agent, or Firm*—Woodard, Emhardt, Naughton, Moriarty & McNett

[57] ABSTRACT

The invention provides that a layer of hardened material is created on the surface of an underground passageway, in particular a sewer so as to restore its utility and the method used is to place a first lining tube in the sewer along its length, and then to evert a second tube of smaller diameter, along the sewer into the first tube. The method is to insert into the first tube a fluent mass against which the second tube is everted and the fluent mass comprises a hardenable material, typically a synthetic resin and a solid particulate material, typically even diameter beads, which serves to limit the thickness to which the mass can be compressed between the tubes whereby an even thickness layer of the fluent mass lying circumferentially of the sewer forms between the tubes, and this layer is held and is hardened either by force or naturally.

14 Claims, 7 Drawing Sheets

INSTALLATION

LINING OF PIPELINES AND PASSAGEWAYS

This invention relates to the technology of the application of linings to the inner surfaces of pipes and pipelines and to the surfaces of passageways. The pipes, pipelines and passageways usually will, but need not be located underground. Also, but again not exclusively, the surfaces to be lined will be located underground.

Therefore, in order to simplify the description, reference will be made hereinafter only to underground passageways and the surfaces thereof which are to be lined, but it will be kept in mind that the invention has wider application.

There is now established throughout the world a lining process known as "soft lining" or "cured in place" lining in which a tubular liner is constructed to have a soft and flexible character so that the liner can be moved into the passageway and, by fluid pressure, urged against the surface to be lined. Because the liner is soft and flexible, it shapes to the surface contour, which is desirable. However, the liner is also constructed so as to include a curable synthetic resin which, after the liner is in position on the surface, can be cured (which means that it becomes hard) and the liner turns into a rigid pipe on the surface. The thickness of this pipe depends upon the thickness of the starting liner tube and this in turn depends upon application involved. The process may be designed so that the cured pipe is bonded to the surface, but in the majority of cases, bonding to the surface will not be necessary, and the pipe will be freestanding in the passageway. Many countries have benefited from this technology insofar as the technology has been used with great effect to rehabilitate the sewers of such countries and restore such sewers to full functioning at a fraction of the cost which would have been involved had full replacement been required. In many cases, the technology has been and continues to be a means which has supplied a long felt want.

The original processes of softlining are described in U.S. Pat. Nos. 4,009,463 and 4,064,211 and these patents describe not only methods of installation of the liner, but also the materials used for the liner. Thus, the first patent describes that the liner comprises a felt material which is impregnated with the synthetic resin and that the so impregnated liner is introduced into the passageway and then inflated onto the surface, following which the liner is heated to cure the resin. In the second patent the liner, composed of the same basic material, is everted into the passageway, this process having a number of advantages over the first method in that the fluid which is used for the eversion is also sued for the urging of the liner against the surface to be lined.

Essentially, these two processes have not changed since their introduction over twenty years ago, although many attempts have been made in this direction.

There is room for improving the basic methods, despite the fact that they have stood the test of time extremely well; and the present invention seeks to provide an improvement in the known softlining methods without sacrificing any of the considerable, existing benefits. In the preparation of the liner in the conventional method involving eversion of the liner, which is the most commonly practised method, a web of felt is made into a tube and if that tube is to form the outer layer of the liner, it also has on its outer surface a film or coating. Inner layers of the felt do not have such coating. After the liner has been thus manufactured, and it is to be used, it is impregnated with the resin by pumping the resin into the liner and by squeezing the liner whilst at the same time drawing a vacuum in the inside of the liner so as to exclude air (which is quite important). The fabrication and usually the impregnation take place under factory conditions, and then the impregnated liner is transported to site for installation as described in said U.S. Pat. No. 4,064,063.

All of this preparation adds to the expense of the installation, as indeed does the cost of the felt material. Also, the felt prevents the use of various fillers, reinforcements and other additives because of the close needle fibre structure. Furthermore, the overall time to effect an installation is increased thereby. The present invention seeks to provide a method of softlining whereby the cost of same is decreased, the method can be carried out more conveniently and much of the processing of the conventional method can be eliminated.

The present invention is based upon the phenomenon that if certain fluent materials are pressed between two parallel planes, the thickness between the planes will reduce until a minimum thickness is reached and there will be no further reduction. Thus, consider a mass of synthetic resin of the type used in the lining methods described above in which are contained a plurality of rigid, similar sized spheres say of the same resin material (but cured). If such a mass is compressed between a pair of parallel plates, and the mass is free to exude to the sides of the plates, the distance between the plates will reduce down to the diameter of the spheres, and there will be only a single layer of spheres (immersed in the resin) between the plates. The invention is based upon this effect. Indeed, in one embodiment of the invention, it is envisaged that resin and spheres as described will be used. However, although there will always be a resin, or other hardenable material present, the material which dictates the thickness between the plates or in the case of the invention, the thickness of the installed liner, can be varied, and can include granular material such as sand and the like. Also, the mechanical properties of the resin can be significantly improved by the use of various fillers, reinforcements and other additives, which can be easily embodied in the resin in the present invention.

Therefore, having regard to the above, according to the present invention there is provided a method of lining a passageway comprising the steps of a) providing along the passageway a first tube which is for lying on the length of the passageway surface to be lined;

b) providing in the first tube a fluent mass including a curable synthetic resin or other hardenable material in which is mixed a particulate, thickness defining material;

c) everting a second tube into the first tube against the mass to trap the said mass between the first and second tubes to press the mass between the first and second tubes down to an even thickness dictated by the mass; and d) curing or hardening of the resin or other hardenable material.

By "particulate material" material as used herein is not intended material of any particular size, and indeed the particles can either be small, such as sand particles, or quite large, such as beads of spherical, ellipsoidal, oval or other shape, or a combination, the important feature being that a body of the particles should exhibit a flowable characteristic, to enable the mass to be pressed or squeezed down to a limiting thickness by the two tubes.

Preferably, a resin is used and the said particulate material comprises a plurality of rigid spheres which conveniently are of the same material as the resin, but in cured form.

The resin of the mass and of the spheres can be any suitable: the conventional process uses mainly polyester and epoxy resin and these can be adopted in the present invention.

It will be understood that the present invention essentially is carried out on side and that extensive preparatory work compared to the conventional method is much reduced. Thus, in the preferred form of the invention, there is no felt utilisation, there is no tube manufacture and there is no tube impregnation. Also, as the mixing of the resin ingredients can take place on site, there is no need to take steps to protect the resin from curing prematurely. In the conventional method, it is often necessary to keep the liner refrigerated whilst it is being transferred from factory to site, in order to prevent premature curing of the resin. Therefore the advantages of the invention are savings in costs (always important) and convenience in operations, which should result in faster installation.

As to the step of curing of the resin, any suitable curing method may be used, depending upon the resin used. For example, heat in form of hot water may be used if the resin is polyester, as done conventionally, or ambient cure may be adopted when the resin is epoxy.

As to the tubes which are used, these may be plastic film tubes of sufficient strength to withstand the pressures which will be involved during the process. They may be reinforced if required and the second tube may be such as to be strippable from the cured resin so as to be reusable. The tubes can be of or include a woven or knitted material and the inner and outer tubes may be provided with differential stretch properties which allow the lining to follow bends in the pipe without developing kinks. When a woven or knitted material is so used, preferably a polyurethane film or coating is bonded to the material to make it impervious and to provide an abrasion resistant inner surface to the lined pipe.

Either or each tube may be provided with a restraining means in the form of a control sleeve which, in the case of the second tube, serves to constrain the tube immediately behind the everting face to prevent the second tube from everting in an uncontrolled manner and to ensure that it evenly everts into the everting face, and, in the case of the first tube, serves to hold the first tube tightly against the mass of resin mixture.

Embodiments of the present invention will now be described with reference to the accompanying diagrammatic drawings, wherein.

Figure 1:
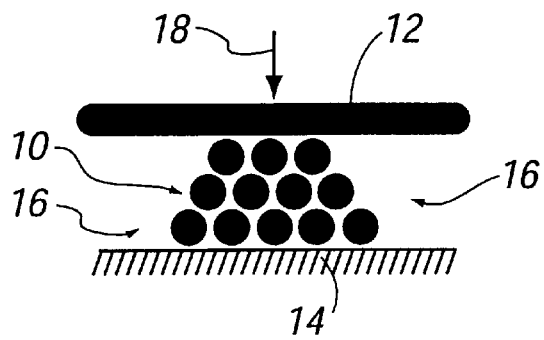
FIG. 1 is a side view to show how a quantity of spheres or beads react when pressed between two plates.

Referring to the drawings, and firstly to FIG. 1, reference 10 illustrates a pile of balls, spheres or beads of the same diameter which are located between two parallel plates 12 and 14. To explain the principle, let it be assumed that the side regions 16 between the plates are open or free so that the beads 10 can move sideways, when pressure is applied, as indicated by the arrow 18, between the plates. When this happens, the pile of beads collapses into a layer of a single bead thickness indicated by reference 20. Items 12 and 14 have been described as plates but they may be formed by other surfaces and indeed in the FIGS. item 12 is a plate, but item 14 is a support surface.

The above phenomenon is made use of in the present invention insofar as the beads (or equivalent material—as explained hereinafter) are mixed with the resin to produce a fluent mass against which an everting tube everts in order to displace the mass and spread it towards the surface to be lined. The spreading action also results in the spread layer automatically assuming a constant thickness, which is highly desirable. The advantages outlined above are also achieved.

Figure 4:
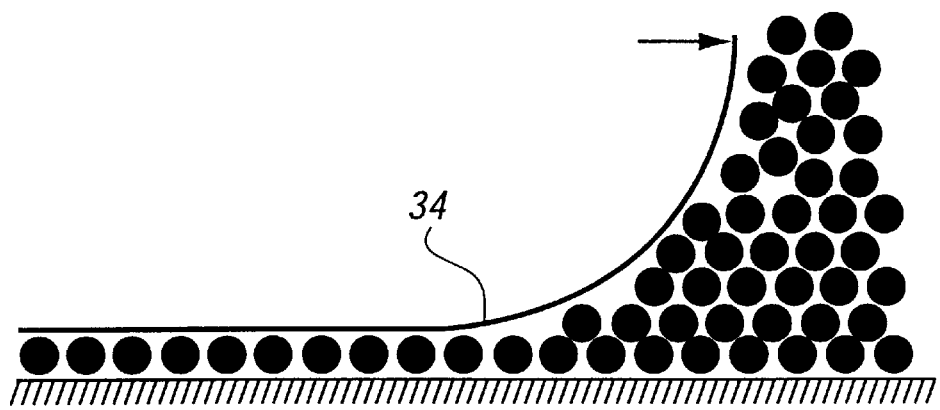
FIG. 4 is an enlarged view showing how the mass of resin and spheres behaves at the everting face during the installation shown in FIG. 3.
Figure 3:
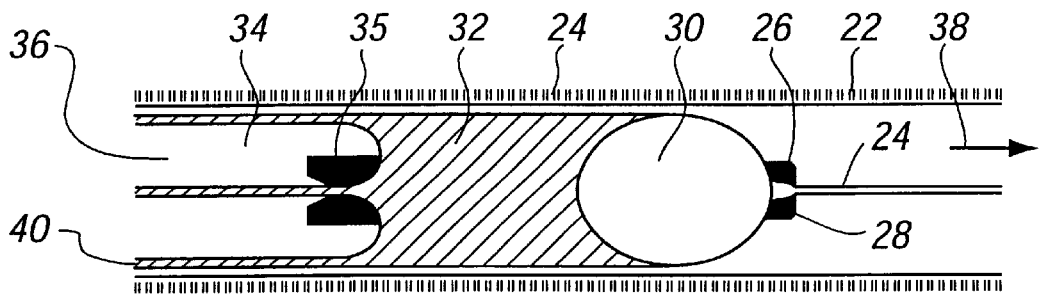
FIG. 3 is a view showing the lining of an underground sewer using the method of the present invention.

Referring now to FIGS. 3 and 4, in FIG. there is shown a lining process according to the invention in operation. The process concerns the lining of an underground sewer 22 and the materials used include a first, strong plastics tube 24 which is inserted into the sewer as a first step, so that the tube 24 extends for the length of the sewer 22 to be lined. The tube 24 at this time is completely flat so as to exclude all the air therefrom, and it has a restrictor 26, in the form of a stout elastic sleeve or band 28 bunching the tube 24 tightly for a purpose to be explained. Inside the tube 24 is a water filled balloon 30 which serves to bear against the inside of the tube 24 as and where it opens up, which is just ahead of the band 28, to prevent leakage of a fluent mass 32 which is also inside the tube 24 as shown.

The fluent mass 32 comprises a liquid, curable resin and, in this example, a sufficient quantity of the beads 10, as shown in enlarged view in FIG. 4, evenly distributed throughout the resin, and against this mass is everted a second strong plastics tube 34, which is everted against the mass 32 by fluid pressure provided for example by water 36 in a manner similar to that used for the conventional eversion lining method described herein.

The tube 34 is also provided with a control sleeve 35 behind the everting face to apply friction to the everting tube 34 to ensure that the everting face is geometrically correct; it also maintains internal pressure for the supporting of the resin layer against the sewer surface.

Figure 2:
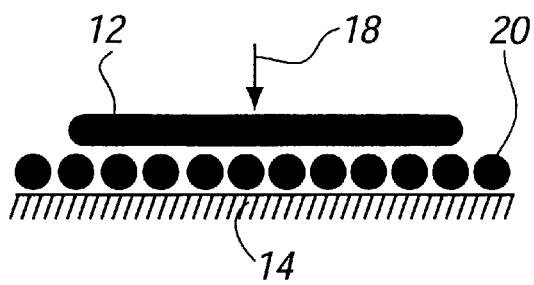
FIG. 2 is a view similar to FIG. 1 but showing a different position.

As will be appreciated, the situation illustrated in FIGS. 3 and 4 is a dynamic situation, in that the eversion of tube 34 is taking place and the balloon 30 is moving to the right in the FIGS. as indicated by the arrow 38, the tube 24 is progressively opening up and the mass of resin 32 is being "spread" onto the inner surface of the tube 24 and by virtue of the phenomenon indicated by FIGS. 1 and 2, the layer 40 of the mass 32 which forms between the tubes 24 and 34 on the surface of the sewer 22 is of even thickness equal to the diameter of one bead. If the beads are of the same material as the resin (but in cured form) they will bond to the resin when it cures, and will become part of the homogeneous mass of a final, cured, resin layer. Of course, it is not necessary that the beads be of the same material, and it is not necessary that the beads be of the same diameter or be exactly spherical. Indeed, as will be explained hereinafter, other materials in addition to or as an alternative to the described beads can be used.

Figure 3A:
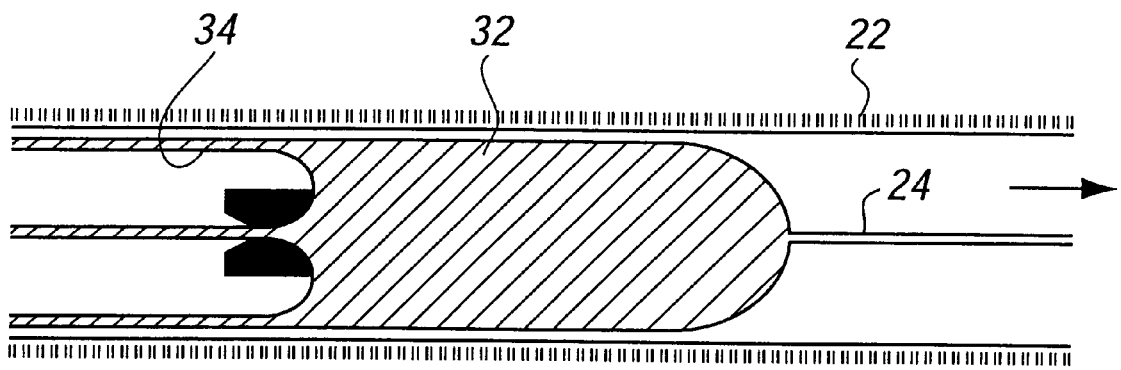
FIG. 3A is a view similar to FIG. 3 showing an alternative arrangement for holding the outer tube closed.

In the arrangement of FIG. 3A, instead of using a restrictor 26, the inside of the tube 24 is provided with an adhesive of suitable tack to keep the tube 24 flat until it is forced to open out as shown in FIG. 3A by the advancing inner tube inner tube 34 and the fluent mass 32. In this FIG., the balloon 30 is omitted but it may be provided if required. This arrangement works in the same manner as described in relation to FIG. 3.

Figure 4A:
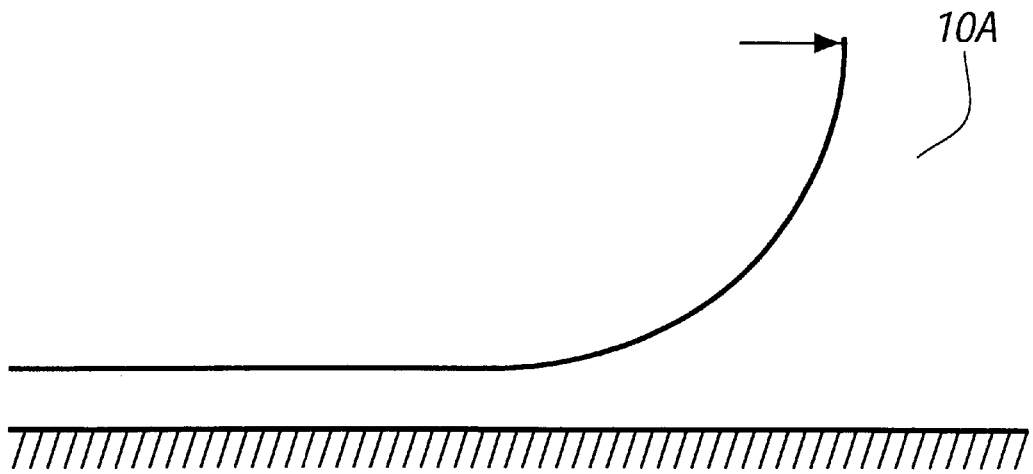
FIGS. 4A and 4B are view similar to FIG. 4, but showing alternative arrangements.
Figure 4B:
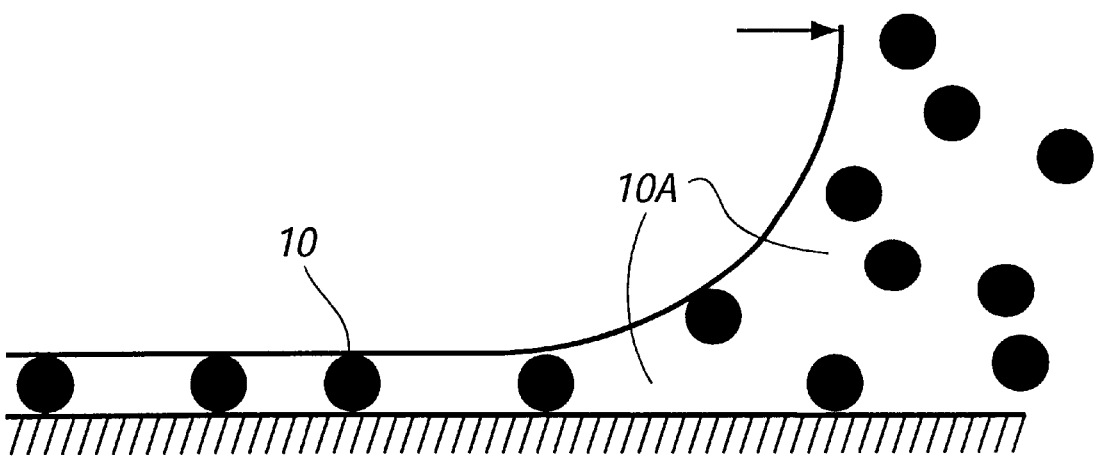

FIGS. 4A and 4b are included to show that the composition of the fluent mass 32 can be varied. In FIG. 4A, the mass is made up of fibres 10A and the resin matrix, whilst in FIG. 4B, the mass is made up of fibres 10A and beads 10.

FIGS. 5 to 8 show a practical method of installing the liner of which the principle of operation is as shown in FIGS. 3 and 4. In these FIGS., the sewer to be lined in again indicated by reference 22 and an access manhole leading from ground level by 42. In the first stage, the first tube 24 has its trailing end 44 attached to the top of an insertion pipe 46 which extends down the manhole 42. At the top, the pipe 46 has flange 48 to which the tube 24 is attached and at the bottom, the pipe has an elbow bend 50 opening to the sewer size to guide the second tube 34 as it everts into the sewer 22.

Figure 5:
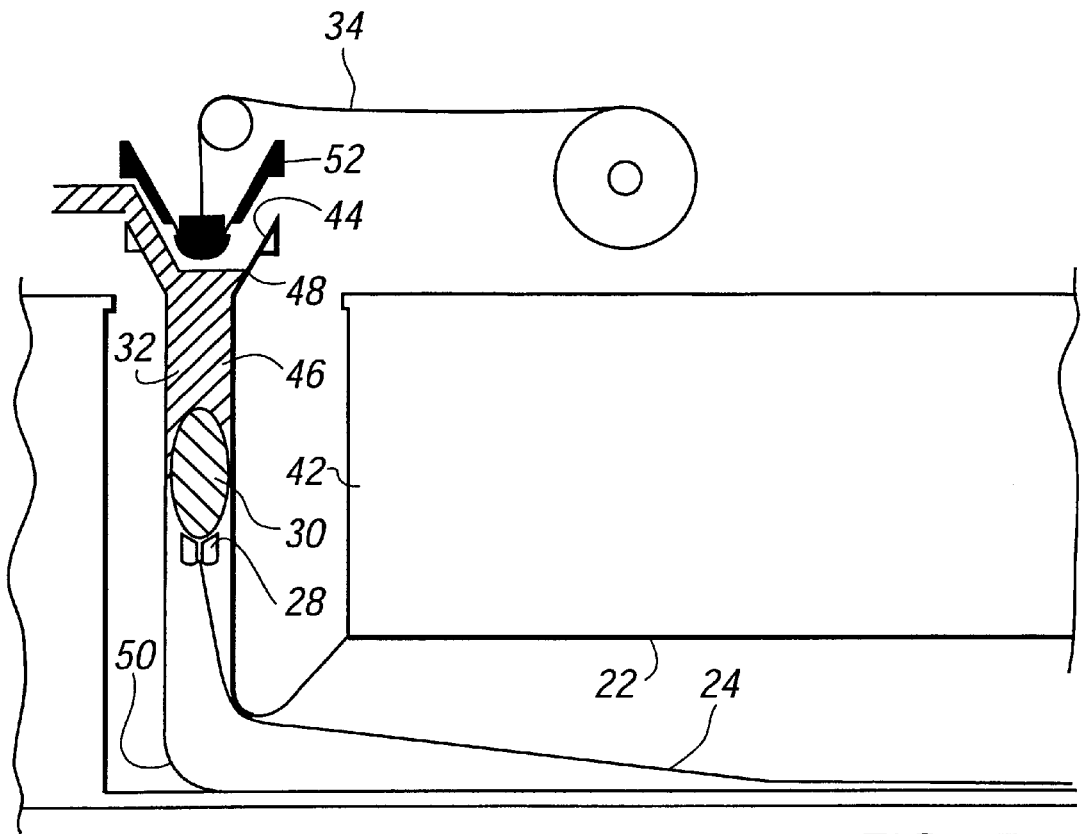
FIGS. 5 to 8 show respective steps in the installation of a liner according to the present invention.

In FIG. 5, the first tube 24 is shown in position and the restrictor sleeve 28 has been applied to the trailing end, the balloon 30 has been inserted and the fluent mass is being charged into the trailing end. The balloon 30 may be of the "rolling pig" type, which means that it can roll upon itself to eliminate friction between the first tube 24 and the balloon 30.

Figure 6:
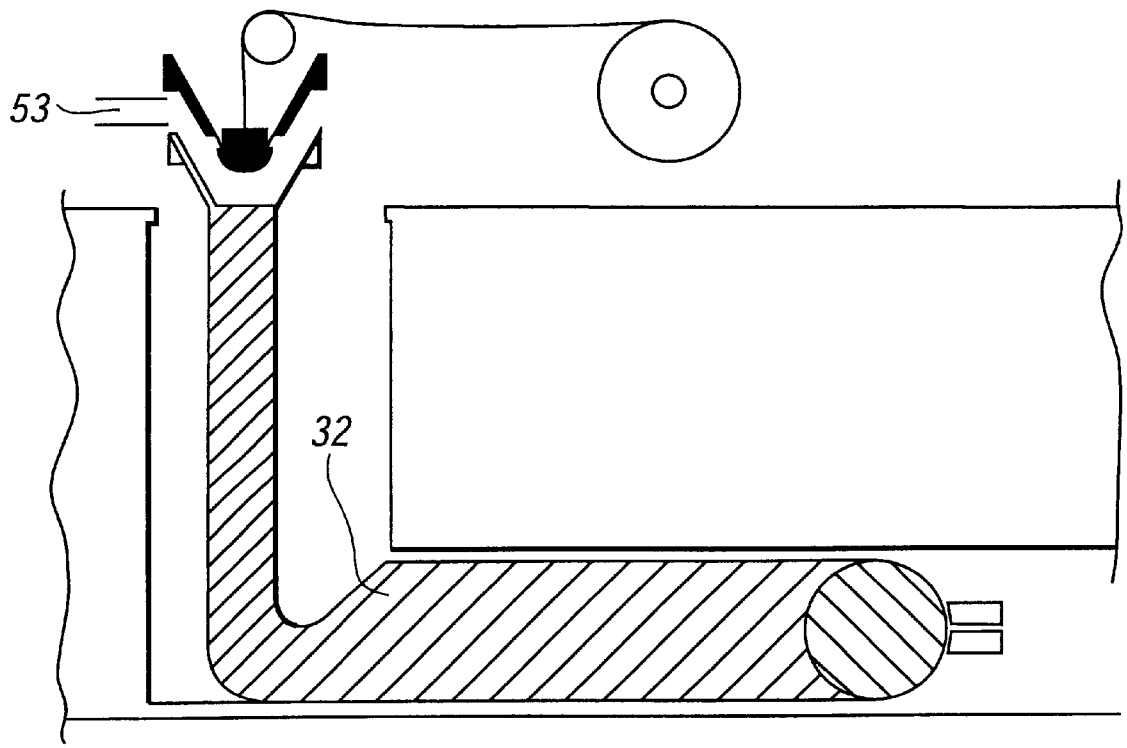

FIG. 6 shows the position after the complete charge (pre-calculated on the basis of sewer length, diameter and thickness required) of the fluent mass has been charged into the tube 24, this mass having been pre-calculated so that the correct layer thickness will be applied throughout the length of sewer to be lined. It will be noticed that during this charging, the balloon 30 and the sleeve 28 move through the pipe 46 and part way into the sewer 22.

FIGS. 5 and 6 also show how the second tube 34 is positioned ready to be everted into the insertion pipe 46 in that a flange fitting 52 is fixed above the top of the insertion pipe 46 and the leading end of the second tube 34 is cuffed back and is attached thereto as shown. FIGS. 5 and 6 also show how the fluent mass 32 is introduced into the insertion pipe 46 at the top end thereof. In FIG. 5, part of the initial charge of fluent mass has been loaded into the insertion pipe 46, and FIG. 6 shows the position when all of the charge has been so loaded. It will be seen that the balloon 30 has travelled part way along the sewer 22 to accommodate the mass. The resin and the beads 10 which form the fluent mass are thoroughly mixed before the charge is loaded into the insertion pipe 46.

Figure 7:
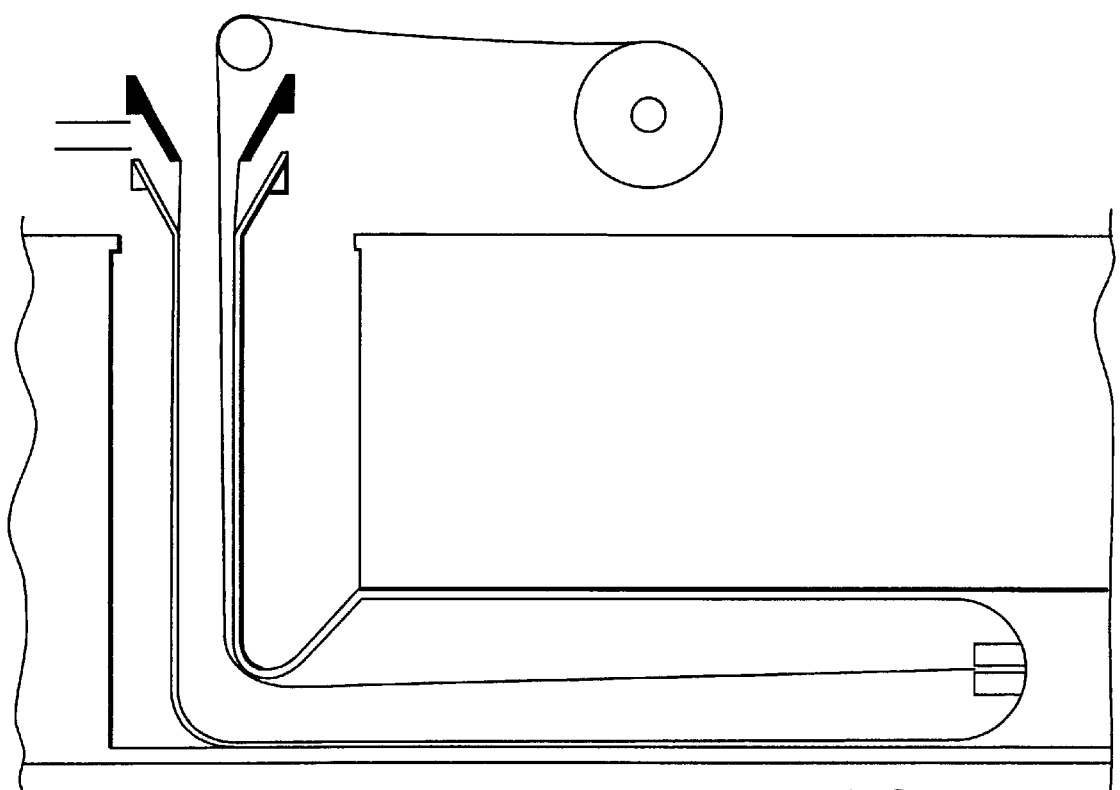
Figure 8:
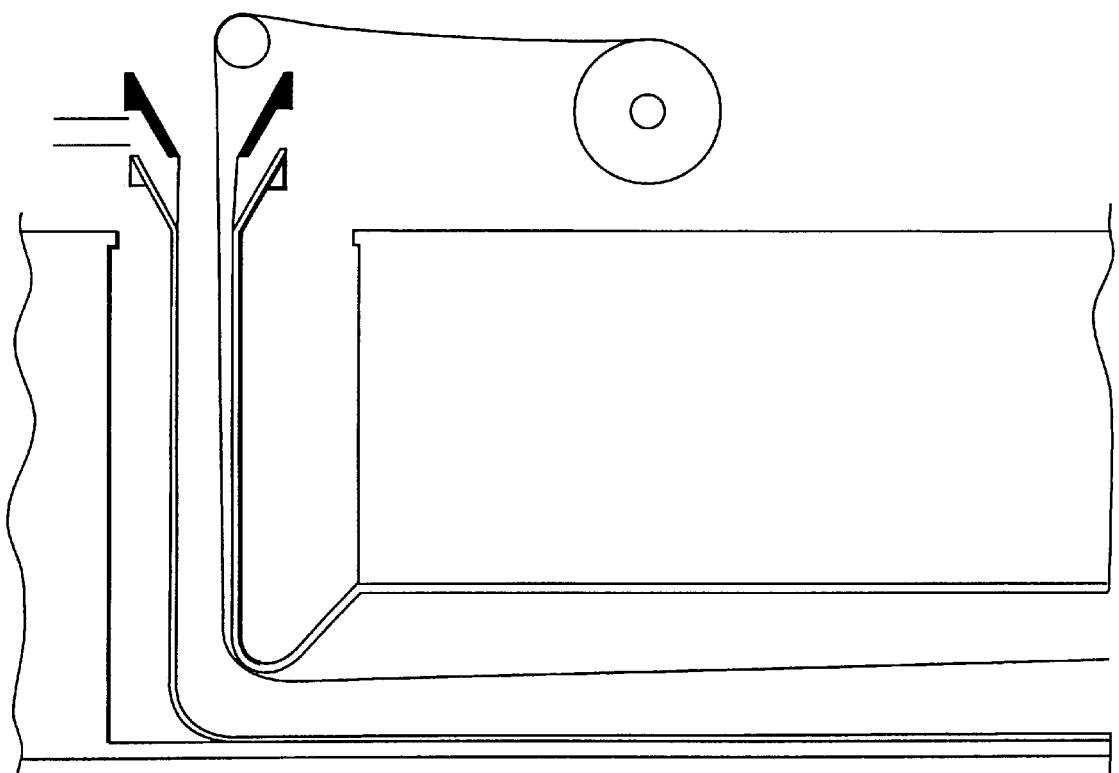

In order to complete the lining operation, the second tube 34 is now everted into the insertion pipe 46 using water from a supply 53 and is eventually everted into and along the inside of the first tube 24, as shown in FIG. 7. FIG. 8 is included to indicate the completion of the lining operation. During the eversion, as described above, the fluent mass is automatically wiped onto the inner surface of the tube 24 in a layer as indicated in FIG. 4 which is of constant thickness, dictated by and equal to the diameter of the beads 10. The beads 10 in this layer are surrounded with the resin and when the resin subsequently cures, the said layer forms the rigid lining pipe, which performs the same function as the pipe in the prior method referred to herein. The embodiment of the invention however has the advantages that no tube fabrication is required, and no pre-impregnation is needed. It can be carried out much quicker than the known method.

The lining operation is preceded by the usual pre-lining steps such as inspection and cleaning of the sewer. Also, the method is suitable for lining other underground pipes such as gas and water pipes.

The quality of the finished liner will depend upon the quality of the materials used, but these materials are basic in nature. The tubes 24 and 34 are sized to the size to the passageway to be lined and the bead size is related to the required thickness of liner, and the following should be noted.

The Tube 34

This tube is to contain the fluent mass under low pressure and in contact with the everting face. It also acts as a means of bridging voids in the passageway wall and entrances to lateral connections, and therefore prevents the fluent mass or the resin thereof, from flowing up the laterals during eversion. The tube may be flat Polythene tube, although other forms of tube such as PVC or high density polyethylene or polyurethane coated fabric may be used. The inside of the tube can be pre-wetted with resin before use to stick the inside surfaces together to eliminate air. As an alternative (see FIGS. 3A and 12A) to sealing using the balloon, the inside of the flat tube may be coated with an adhesive whose pull resistance will resist inflation and hence maintain low pressure in the advancing liner material. The outer liner is very light and offers little resistance to winching and hence can be used to line long lengths of sewer.

The Tube 24

This tube can be of similar construction to that of the tube 34, but will be of smaller diameter. Again, because of its lightness it can be everted through many hundreds of meters of sewer, especially if water is used for the eversion.

Inversion Control Sleeve 35

This serves the purpose of removing major creases in tube 24 to the rear of the eversion face and improves the geometric shape of the advancing eversion face. The sleeve should have an inner diameter small enough so that there is resistance to movement of the second tube into the everting face. The sleeve is preferably of rubber.

Inflation Control Sleeve 28

This component may any suitable and may be of the same construction as the sleeve 35.

In the example described, a resin and bead mixture is used. Modified mixtures can be adopted. Thus, cement grout-aggregate mixtures can be used. Fibre reinforcement can be added and it may be in a woven form or loose fibres or chopped strands.

As stated, when beads are used, these may be chemically and physically compatible with the resin, as a good bead between the beads and the cured resin is highly desirable; this can be achieved chemically and/or mechanically by providing the beads with a dimpled or frosted surface or a surface with projecting fibres.

Typically, the fluent mass mixture may be 40% resin and 60% beads (by volume). When aggregates are used, these may be readily available materials, such as rounded pebbles or manufactured glass spheres of selected sizes. When these are mixed with appropriate quantities of grout, sand and cement and set, good quality concrete is produced. Additives can be used for controlling the setting times.

For high pressure applications a woven or matt fibreglass outer reinforcement tube can be incorporated into the liner. This reinforcement layer, suitably wetted, is made integral with the outer liner tube which is pulled through the pipe to be lined to the beginning of the insertion stage. When the resin-bead or grout-aggregate material is inserted it will complete the wetting out of the fibre reinforcement and thereby bond it to the outside of the lining. The possibility of air being trapped in the reinforcement material can be overcome saturating the material with resin (without hardener) or water respectively. The action of eversion will ensure the reinforcement material is penetrated by the base material.

The basic invention is the utilisation of a fluent hardenable material e.g. the resin or the grout and to include therein the solid particulate material e.g. the spheres, pebbles balls of appropriate material, and/or other material such as sand which has the effect as described herein of dictating the thickness of the finished liner when a first tube is placed in the passageway, and is charged with the fluent mass so that air is excluded, and a second tube is everted against the mass, whilst the assembly moves along the passageway, the second tube being inflated with air or water and the second tube being inflated by the first tube, the mixture being spread between the tubes to form a lining on the passageway surface which can be cured to form a hard lining pipe similar to the conventional lining.

It will be understood that to perform a complete installation, preparatory and finishing work must be performed, and generally speaking this can be as currently practised in the conventional method. Thus, the side must be prepared, the passageway must be inspected and cleaned, the flow of the medium normally carried by the passageway must be diverted clear of the section of passageway (between manholes) being lined.

Sufficient time must be allowed to enable the resin or grout to cure or harden and any suitable cure method may be adopted for the cure depending upon the resin/grout selected. Finishing operations include cutting and trimming of the cured mass, and re-establishment of the lateral connections, and the second tube can either be of a nature which sticks to the cured mass or can be peeled therefrom for reuse.

The method can be used to line long lengths of underground passageways between manholes in one pass, and at the downstream manhole, there may be a receiving pipe, similar to the insertion pipe which has a bend into which the second tube turns, and the turned end can be removed as part of the finishing operation. During the lining operation, any air in the second tube is forced through the tube and out of the trailing end.

Experimental lab top tests have indicated that the method works extremely well. In these initial tests, only dry polyethylene beads were used, but they positively regrouped into a single layer between the tubes in a rapid manner when one tube was everted into the other, with the beads trapped therebetween. The beads were not of an exact spherical shape and although of a similar size, they were not of identical size. The use of control sleeves enhanced the operation considerably.

Figure 9:
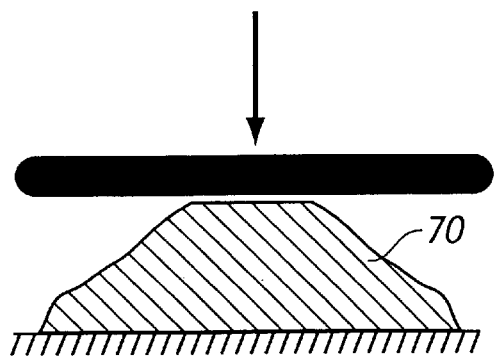
FIGS. 9, 10 and 11 show, in views similar to FIGS. 1, 2 and 4, an alternative embodiment of the invention.
Figure 10:
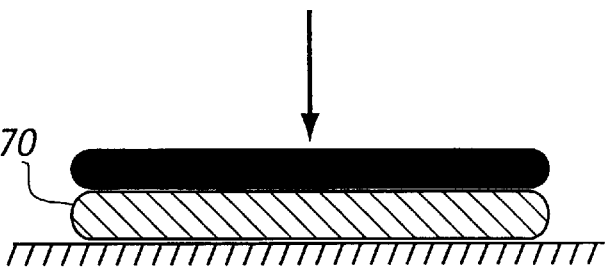
Figure 11:
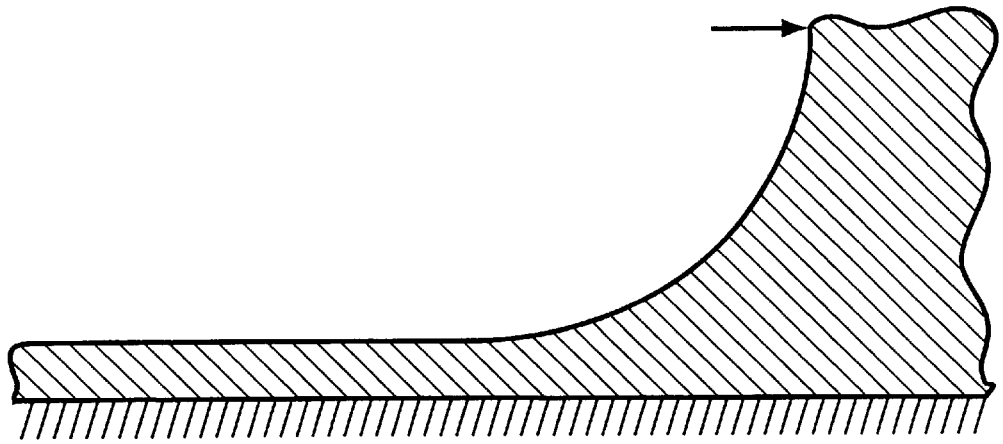

The above basic experiments were followed by ones to make an actual pipe using a polyester resin containing polyester beads of 10 mm diameter. Using water, the second tube was everted into the first tube which contained the mass of resin and beads and an excellent pipe was obtained. FIGS. 9 to 11 have been included to show a variation of the invention. The FIGS. are similar to FIGS. 1, 2 and 4, and the only difference is that instead of beads 10, particles of sand 70 are used. In FIGS. 9 and 10, dry sand only is shown, and how it behaves when subjected to pressure between two plates, and FIG. 11 shows that a mixture of the sand and resin behaves similar to the beads and resin when subjected to the eversion pressure resulting from one tube being everted into the other. Other particles instead of sand can be used. The thickness to which the sand will be compacted c.f. FIGS. 9 and 10, will depend upon the properties of the sand or other material.

Figure 12:
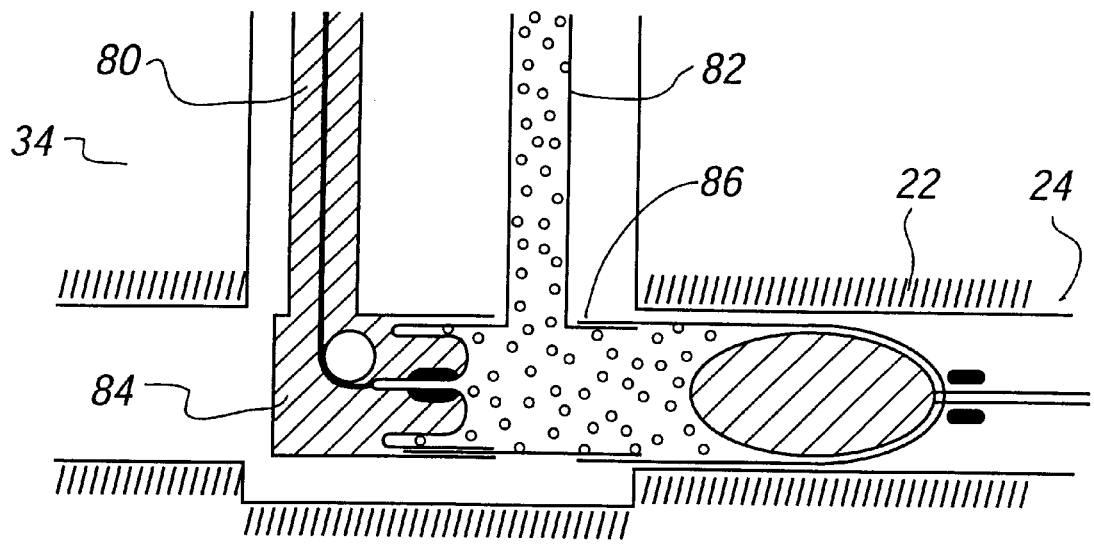
FIG. 12 shows a simplified method of insertion.

FIG. 12 is included to show that another method can be adopted for the insertion process. In the arrangement shown, there are two separate feed pipes 80 and 82 which lead from ground level, down the manhole to the sewer 22 to be lined. At the lower end, the pipe 80 has a cylindrical leg 84 which closed at one side and open at the other. The pipe 82 has at its lower end, a T-shaped head 86 which is open at both ends. The tube 24 has its trailing end attached to one side of the head 86, and the leading end of the tube 34 is wrapped around and fixed to the other side of the head 86. The said other side fits into the open side of the leg 84 sealingly and the tube 34 extends up the pipe 80 to ground level.

The operation of the arrangement of FIG. 12 will be readily understood in that the fluent mass is introduced through pipe 82 until the position shown is reached, and thereafter water or other inflation medium is introduced into the pipe 80 to cause the tube 34 to evert into and along the tube 24 with the results already explained in relation to the other FIGS., and the lining is effected as described in relation to FIGS. 7 and 8. Reference numerals already used in earlier FIGS. have been used in FIG. 12.

Figure 12A:
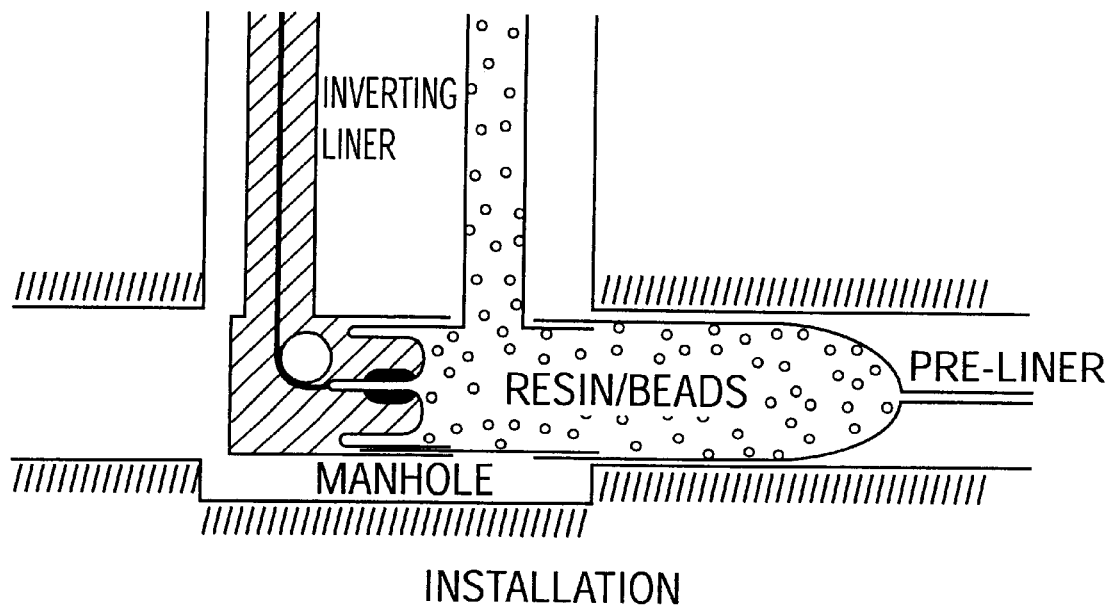
FIG. 12A shows a view similar to FIG. 12, showing an alternative arrangement for holding the outer tube closed.

FIG. 12A shows that the FIG. 12 method can be varied by using, as in FIG. 3A an outer tube which does not use the restrictor but also uses an adhesive inside the tube to keep it flat, and to exclude air, until it is forced open in a manner similar to FIGS. 3 and 3A.

The invention has many advantages, including but not limited to the following:

Significant cost savings (estimated at 37%) can be effected, compared to the conventional systems Widely available, varied and relatively inexpensive materials can be used The lining process can be performed quickly and easily The invention can be applied to a wide range of pipes, including sewer, gas and water pipes which are located underground or above ground.

What is claimed is:

1. A method of lining a passageway (22) comprising the steps of
   a) providing along the passageway a first tube (24) which is for lying on the length of the passageway surface to be lined;
   b) providing in the first tube (24) a fluent mass (32) including a curable synthetic resin or other hardenable material in which is mixed a particulate material (10);
   c) everting a second tube (34) into the first tube (24) against the mass (32) to trap the said mass (32) between the first and second tubes (24,34) to press the mass (32) between the first and second tubes (24, 34) down to an even thickness (40) dictated by the material (10); and
   d) curing or hardening of the resin or other hardenable material,
   characterised by the step of restraining the second tube (34), during the eversion, immediately behind the everting face to prevent the second tube (34) from everting in an uncontrolled manner and to ensure that it evenly everts into the everting face.

2. A method according to claim 1, wherein a curable synthetic resin is used and the said particulate material comprises a plurality of rigid spheres (10) which conveniently are of the same material as the resin, but in cured form.

3. A method according to claim 1, wherein a curable synthetic resin is used and the particulate material includes granular particles.

4. A method according to claim 1, wherein a curable synthetic resin is used and the particulate material includes fibres.

5. A method according to claim 1, wherein the resin of the mass (32) is polyester or epoxy resin.

6. A method according to claim 1, wherein the mixing of the fluent mass (32) ingredients takes place on site.

7. A method according to claim 1, wherein heat in form of hot water is used to harden the hardenable material.

8. A method according to claim 1, wherein either or each of the tubes (24,34) comprises a plastic film tube, with or without woven or knitted reinforcement of sufficient strength to withstand the pressures which will be involved during the process.

9. A method according to claim 8, wherein either or each of the tubes (24,34) is reinforced.

10. A method according to claim 1, wherein the second tube (34) is such as to be strippable from the cured material so as to be reusable.

11. A method according to claim 1 wherein the first tube (24) is provided with a restraining means (26) which serves to hold the first tube (24) tightly against the mass (32) of the resin mixture.

12. A method according to claim 11, wherein the restraining means is in the form of a control sleeve (28) of rubber material which pinches around the tube (24) which it restrains.

13. A method according to claim 11, wherein the restraining means comprises an adhesive in the inside of the tube (24) to keep it flat until opened out by the eversion of the inner tube.

14. A method according to claim 1, wherein the second tube is restrained by means of a sleeve which pinches around the tube behind the everting face.

* * * * *